UNITED STATES PATENT OFFICE.

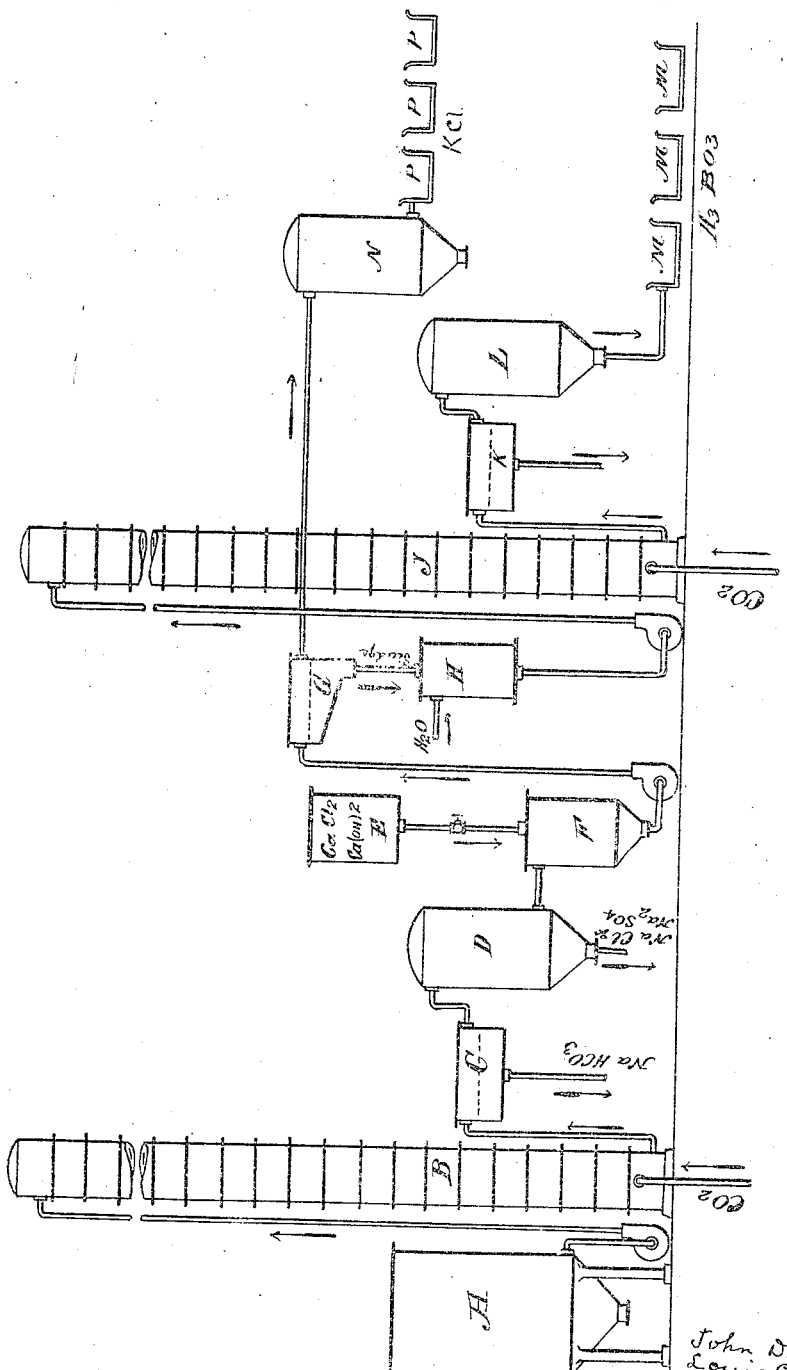

JOHN D. PENNOCK, LOUIS C. JONES, AND FRED LESLIE GROVER, OF SYRACUSE, NEW YORK, ASSIGNORS TO THE SOLVAY PROCESS COMPANY, OF SOLVAY, NEW YORK, A CORPORATION OF NEW YORK.

PROCESS OF RECOVERING CONSTITUENTS OF VALUE FROM NATURAL ALKALINE DEPOSITS.

1,215,574.      Specification of Letters Patent.      Patented Feb. 13, 1917.

Application filed December 16, 1915. Serial No. 67,141.

*To all whom it may concern:*

Be it known that we, JOHN D. PENNOCK, LOUIS C. JONES, and FRED LESLIE GROVER, citizens of the United States, residing at Syracuse, in the county of Onondaga and State of New York, have invented a new and Improved Process of Recovering Constituents of Value from Natural Alkaline Deposits, of which the following is a specification.

As is well known there are in the United States and elsewhere extensive natural deposits of salts both in the solid form and in solution in alkaline lakes. Among the constituents of these are salts of value such as soda, borax and potash, and the object of our improvements is to separate these from the accompanying impurities to the end of recovering them in a commercially pure condition.

In describing our invention we shall speak of the process as beginning with the treatment of a solution of the salts such, for example, as is found in the waters of alkaline lakes. It will be understood, however, that such a solution may be formed by dissolving the mixed salts in water and thus solid deposits thereof can be equally well utilized.

For the more ready understanding of our invention we shall describe it herein in connection with the accompanying drawing which illustrates in diagrammatic form an organization of apparatus which may be used in carrying it into effect. It is not, however, limited to the use of this, or any particular form of apparatus but only to those operative features hereinafter set forth and stated in the appended claims.

In carrying our invention into effect the solution to be treated is, if necessary, concentrated by evaporation to such a point, or is formed of such concentration, that practically all the sodium carbonate can be removed by treatment with carbon dioxid and the organic and other solid matter in suspension therein is allowed to settle out as in a settling tank, A.

From the settling tank, A, the clear solution is pumped to the top of a tower or column, B, wherein it is subjected to the action of carbon dioxid gas which is admitted at the bottom of the column. In this way the sodium carbonate is practically all converted into sodium bicarbonate according to the formula

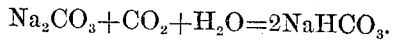

$$Na_2CO_3 + CO_2 + H_2O = 2NaHCO_3.$$

The precipitated sodium bicarbonate is filtered off and washed and may be sold as such, or calcined and sold as sodium carbonate.

The next step of the process is directed to effecting the removal of the bulk of the sodium chlorid and sodium sulfate from the solution and concentration of the potash salts.

To this end the solution from which the sodium bicarbonate has been filtered out is evaporated as in a vacuum pan, D, and thus the sodium chlorid and sodium sulfate are precipitated as solid salts and continually removed and rejected.

The evaporation is continued until the removal of the maximum amount of sodium chlorid and sodium sulfate that can be precipitated without loss of potassium salts, has been effected, *i. e.*, until solid salts of potassium just begin to be deposited, when it is discontinued.

In conducting this step of the process regard should be had to the temperature at which the evaporation is effected. As a general rule we have found that the higher the temperature at which the evaporation and removal of the salts takes place, the more tardy will be the precipitation of potassium salts and therefore the more concentrated the solution will become in these and the more complete the removal of sodium chlorid and sodium sulfate. We have found 98.2° C. a desirable minimum temperature at which good results can be accomplished but the temperature may be advantageously raised even above this. At these high temperatures also the solution will not become saturated with sodium tetraborate at the point where potassium salts begin to be deposited.

As a specific indication of the stopping of evaporation under the given conditions—if the solution is being evaporated at a temperature of 98.2° C. while sodium chlorid and sodium sulfate are depositing and the solution is about 25% saturated with sodium borate, then when a test for potassium shows 50.4 molecules KCl to 1000 molecules of $H_2O$ in the solution (sp. gr. 1.271 at 98.2° C.) the evaporation is stopped.

The solution resulting from this stop of the process contains practically all the potash and all the borax in such proportions that if evaporated to dryness a crude marketable potash salt is obtained containing in excess of 15 per cent. $K_2O$.

In order, however, to separate and recover the potassium salts as refined potassium chlorid with separate recovery of boric acid we proceed as follows.

The solution from the preceding step of the process is discharged from the vacuum pan into a precipitating tank, F, and a solution of calcium chlorid ($CaCl_2$) and milk of lime ($CaO_2H_2$) is added, preferably in slight excess over the quantity required to convert the sodium sulfate present into calcium sulfate and the boric acid into calcium borate according to the reactions—

$$Na_2SO_4 + CaCl_2 = 2NaCl + CaSO_4$$

and

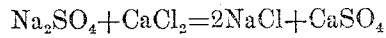

$$Na_2B_4O_7 + CaCl_2 + CaO_2H_2 = 2NaCl + 2CaB_2O_4 + H_2O.$$

In this way practically all the sulfate and borate are precipitated as insoluble calcium salts. Any sodium carbonate that may have been left in the solution will also by this means be converted into insoluble calcium carbonate and precipitated.

The precipitates are then filtered out in filter, G, and the filtered solution containing potassium chlorid and sodium chlorid is run into a vacuum pan, N, and evaporated with precipitation of sodium chlorid until the point of concentration is reached where potassium chlorid begins to be deposited when the hot solution is run into crystallizing vats, P, P, wherein commercially pure potassium chlorid crystallizes out on cooling.

In order to recover the boric acid content the sludge from filter, G, is run into a tank, H, where it is suspended in water and then pumped to the top of a wash column, J, wherein it is subjected to the action of carbon-dioxid gas admitted at the bottom. In this manner the calcium borate is broken up and converted into insoluble calcium carbonate and boric acid in solution according to the formula—

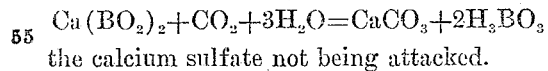

$$Ca(BO_2)_2 + CO_2 + 3H_2O = CaCO_3 + 2H_3BO_3$$

the calcium sulfate not being attacked.

The insoluble precipitates, consisting essentially of calcium sulfate and calcium carbonate, are then filtered out on filter, K, and the solution is sucked into vacuum pan, L, where it is evaporated to the crystallizing point of boric acid which is crystallized out on cooling in the vats, M. M.

If preferred the solution may, before concentration, be treated with soda, resulting in the formation of sodium borate ($Na_2B_4O_7$), which on evaporation and crystallization yields borax ($Na_2B_4O_7 10H_2O$).

By our process we are thus able to recover in separate commercial form the originally intermingled, and hence valueless, components of alkaline waters and deposits the advantage of which will be apparent to those skilled in the art.

What we claim as new and desire to secure by Letters Patent, is:

1. The process of separating and recovering components of value from natural alkaline deposits which consists in treating a solution thereof to convert the contained sodium carbonate into sodium bicarbonate and removing the bicarbonate; concentrating the solution by evaporation to throw down sodium chlorid and sodium sulfate with retention of the potassium salts; treating the resulting solution with calcium chlorid and milk of lime to convert the sulfate, borate and carbonate radicals into insoluble calcium salts; filtering the product and subjecting the cleared solution to alternate hot and cold crystallization to separately recover the contained sodium chlorid and potassium chlorid.

2. The process of separating and recovering components of value from natural alkaline deposits which consists in treating a solution thereof to convert the contained sodium carbonate into sodium bicarbonate and removing the bicarbonate; concentrating the solution by evaporation to throw down sodium chlorid and sodium sulfate with retention of the potassium salts; treating the resulting solution to convert the contained sulfate, borate and carbonate radicals into insoluble salts leaving in solution sodium chlorid and potassium chlorid; filtering the product and subjecting the cleared solution to alternate hot and cold crystallization to separately recover the contained sodium chlorid and potassium chlorid.

3. The process of separating and recovering components of value from natural alkaline deposits which consists in first freeing a solution thereof of the contained sodium carbonate; concentrating the freed solution by evaporation to throw down sodium chlorid and sodium sulfate with retention of the potassium salts; treating the resulting solution to convert the contained sulfate, borate and carbonate radicals into insoluble salts leaving in solution sodium chlorid and potassium chlorid; filtering the product and subjecting the cleared solution to alternate hot and cold crystallization to separately recover the contained sodium chlorid and potassium chlorid.

4. In the process of recovering refined potassium chlorid from natural alkaline deposits the method of separating the potassium salts from sulfate, borate and carbonate radicals contained in solution therewith which consists in treating the solution with a solution of calcium chlorid and milk of lime whereby said radicals are converted into insoluble calcium salts leaving the potassium salts in solution and filtering out the precipitate from the solution.

In testimony whereof, we have hereunto subscribed our names, this 13th day of December, A. D., 1915.

JOHN D. PENNOCK.
LOUIS C. JONES.
FRED LESLIE GROVER.

Witnesses:
H. W. JORDAN,
H. DUANE BRUCE.